United States Patent [19]

Giglia

[11] Patent Number: 4,495,030

[45] Date of Patent: Jan. 22, 1985

[54] FILTER PAPER

[75] Inventor: Robert D. Giglia, Rye, N.Y.

[73] Assignee: American Cyanamid Co., Stamford, Conn.

[21] Appl. No.: 561,752

[22] Filed: Dec. 15, 1983

[51] Int. Cl.³ .................. A62B 23/00; A62B 23/04; B01D 39/14; B01D 39/16; B01D 39/20

[52] U.S. Cl. .................................. 162/145; 2/2; 55/527; 55/528; 162/146; 162/149; 162/181.9; 428/283; 428/289; 428/290; 428/421; 428/903

[58] Field of Search ............... 55/527, 528; 162/145, 162/146, 149, 181.9; 428/283, 289, 290, 421, 903; 2/2

[56] References Cited

U.S. PATENT DOCUMENTS

| 3,971,373 | 7/1976 | Braun | 428/328 |
|---|---|---|---|
| 4,118,531 | 10/1978 | Houser | 428/362 |
| 4,239,516 | 12/1980 | Klein | 55/528 |
| 4,286,977 | 9/1981 | Klein | 162/145 |
| 4,293,378 | 10/1981 | Klein | 55/527 |
| 4,318,774 | 3/1982 | Powell et al. | 55/527 |
| 4,344,775 | 8/1982 | Klein | 162/145 |
| 4,376,675 | 3/1983 | Perrotta | 162/145 |
| 4,397,907 | 8/1983 | Rosser et al. | 428/372 |
| 4,429,001 | 1/1984 | Kolpin et al. | 428/903 |
| 4,433,024 | 2/1984 | Eian | 428/408 |

Primary Examiner—James C. Cannon
Attorney, Agent, or Firm—Steven J. Hultquist

[57] ABSTRACT

A high efficiency, toxic vapor absorptive non-woven filter material comprising a wet-laid sheet containing fibrillated binder fiber, active carbon and submicron size glass fiber.

8 Claims, No Drawings

FILTER PAPER

BACKGROUND OF THE INVENTION

The need for highly efficient filter materials has long been recognized by both military and commercial personnel. The manufacture and use of certain dangerous chemicals such as pesticides, toxic materials etc., in the form of sprays or mists, gases etc., requires that personnel involved therewith be provided the safest protection available. Protection, e.g., in the form of gas masks, has, in the past, not been completely satisfactory in filtering both aerosols and particulates at a low pressure drop. Furthermore, most previously used filter materials do not provide toxic vapor absorption as well as highly efficient mechanical filtration.

Accordingly, if a filter material could be developed which overcame the disadvantages of previous filters, a step forward in the art would be achieved.

SUMMARY OF THE INVENTION

According to the present invention, a non-woven filter material containing active carbon and submicron size glass fibers is produced via the wet-laying process, utilizing fibrillated fibers as the binder material, the filter providing excellent removal of aerosols, particulates and toxic vapors. The filters of the present invention have exhibited filtration index numbers over nine whereas previously used filters have exhibited values of slightly more than four.

DESCRIPTION OF THE INVENTION INCLUDING PREFERRED EMBODIMENTS

In accordance with the present invention, there is provided a high efficiency, toxic vapor absorptive, non-woven filter material comprising (a) active carbon,
(b) submicron size glass fibers and
(c) fibrillated binder fibers.

The novel products of the present invention are prepared by wet-laying the active carbon, preferably in the form of fibers, submicron size glass fibers and fibrillated binder fibers from a water suspension thereof. The suspension should contain from about 2–20%, by weight, based on the total weight of the filter material, preferably from about 5–15%, by weight, of the fibrillated binder fibers, from about 30–80%, by weight, same basis, preferably from about 40–70%, by weight, of the active carbon and from about 10–50%, by weight, same basis, preferably from about 15–40%, by weight, of the submicron size glass fibers, the total weight of the three components being 100%.

The active carbon, submicron size glass fibers, and fibrillated binder fiber are wet-laid using the conventional papermaking process well known in the art. Flocculating agents and surface active agents can be incorporated into the water suspension in order to facilitate the paper making procedure as is also known in the art. The binder fiber may comprise any materials known to be useful for this purpose, such as polyester fiber, polyolefin fiber, etc., however, the preferred fiber comprises acrylic fiber which may be produced from any known acrylic polymers such as polyacrylonitrile, copolymers of acrylonitrile and other copolymerizable monomers such as methyl methacrylate, ethyl acrylate, etc.; homopolymers and copolymers of other fibers forming monoethylenically unsaturated monomers such as vinyl acetate, vinyl chloride, styrene, vinyl pyridine, acrylic esters, acrylamide and the like.

Fibrillation of the binder fibers, which should range from about 1 mm to about 25 mm in length, is accomplished as is known in the art, i.e., such as by high speed shearing of the fibers.

The active carbon component of the novel filter of the present invention can comprise carbon particles or carbon fibers or mixtures thereof, carbon fibers being preferred. These carbon fibers are well-known in the art as are methods for their production. They can be used in lengths of from about 0.3 to about 15.0 mm, preferably from about 0.5 to about 10.0 mm, and can be prepared from such carbon fiber precursors as coal tar pitch, petroleum pitch, coal tar, petroleum derived thermal tar, ethylene tars, high-boiling coal tar distillates, ethylene tar distillates, gas oils or polynuclear aromatics. Also useful as precursors are polymers such as acrylonitrile homopolymers and copolymers, polyvinylalcohol, and natural and regenerated cellulose. Methods for preparing activated carbon fibers useful herein are disclosed in U.S. Pat. Nos. 4,069,297 and 4,285,831, which patents are hereby incorporated herein by reference.

The activated carbon powders or particles useful herein should have a particle size ranging from about 0.1 $\mu$m to about 100 $\mu$m, preferably from about 1.0 $\mu$m to about 80 $\mu$m and may also be prepared from any of the carbon precursors described above.

The submicron size glass fibers useful herein are taught in the art and any known method for their production can be used to prepare them. The range in length is from about 1 $\mu$m to about 3500 $\mu$m, preferbly from about 10 $\mu$m to about 2000 $\mu$m.

The wet-lay sheet making process (papermaking) used herein for the production of the novel filter material of the present invention, results in a filter having unique sorptive characteristics, a thickness of at least about 0.005, preferably at least 0.01 inch, a high sorptive capacity to weight ratio and high porosity to fluid flow. The filter has superior filtering efficiency for aerosols and particulates and achieves this high efficiency at very low pressure drops. The filter has the capacity to remove toxic vapors from a gas stream by absorption and thus combines improved mechanical filtration through pores with absorption. The active carbon, when present as a fiber, tends to lay parallel to the plane of the sheet, and thus produces a long fluid flow path through the sheet which increases the time available to absorb impurities.

The novel filter material of the present invention may be exposed during or after is production to procedures to provide property enhancement. Thus, the surface of the novel filter material claimed herein may be rendered hydrophobic or oleophobic by treatment with such materials as methyltrichlorosilane, a polymer such as polytetrafluoroethylene, or PFOMA (1,1-dihydropentadecafluorooctylmethacrylate. Additionally, a reactive coating capable of decomposing toxic agents, e.g., a coating of sulfonated polymer to hydrolyze nerve gas, may be applied thereto so that the active carbon forms a second line of defense. Moreover, treatment of the filter with known mildewcides results in the production of mildew resistant materials.

The filter material of the present invention has a wide variety of uses. It is useful for protective purposes, i.e., for the filtration and separation of gases, aerosols, and particulates. The uses include the manufacture of the filter material into components for air filtration systems, air filters for military vehicles and stationary facilities, gas mask cannisters and cartridges, gas purification filters, and the like.

The following examples are set forth for the purpose of illustration only and are not to be construed as limitations on the present invention except as set forth in the appended claims. All parts and percentages are by weight unless otherwise specified.

EXAMPLE 1

A mixture of 10% fibrillated acrylic fibers, 80% activated carbon fiber and 10% Type 104 glass fiber in 18 l. of water are formed into a 12"×12" sheet using a standard hand paper making machine. The sheet is dried under pressure at 70° C. to 120° C. The resultant filter material is then tested. The results are set forth in Table I, below.

EXAMPLE 2

The procedure of Example 1 is again followed except that 10% fibrillated acrylic fiber, 65% activated carbon fiber and 25% Type 104 glass fiber are employed. The results of testing are set forth in Table I, below.

EXAMPLE 3

The procedure of Example 1 is again followed except that 50% fibrillated acrylic fiber and 40% Type 104 glass fiber are employed. The testing results are set forth below in Table I.

EXAMPLES 4–6

The filter materials of Examples 1–3, are individually treated with 1,1-dihydropentadecafluorooctylmethylacrylate and tested. The results are set forth in Table II, below.

In Tables I and II, below, thickness is measured on a TMI Model 551M micrometer gage. Tensile strength is evaluated on a Thwing-Albert Electro-hydraulic Tensile Tester Model No. 30LT. Porosity is calculated from measurements made using a Gurley-Hill S-P-S Tester and Dynamic Sorption is calculated based upon a threat concentration of 760 ppm $CCl_4$ in nitrogen, a downstream limit of 1.0 ppm $CCl_4$ and a flow density of 2.5 ml/min./cm$^2$. According to the equation:

Dynamic Sorption ($CCl_4$) =

$$\frac{\text{Break Time (min.)} \times \text{Concentration (mg/l)}}{4 \times \text{Area of Sample (100 cm}^2\text{)}}$$

The Static Sorption is measured by determining the gain in weight of a sample stabilized in saturated $CCl_4$ vapor at room temperature divided by the starting sample weight.

Both Pressure Drop and Particle Smoke Penetration are measured on a Q127 DOP Filter Testing Penetrometer. This equipment maintains a flow velocity of 850 cm/min. (32 liters per minute through an area of 37.61 cm$^2$). The Penetrometer generates dioctylphthalate (DOP) particles of 0.3 diameter average at test concentrations of 100 mg/l.

The Filtration Index is a measure of the general effectiveness of a filter and takes into account the compromise between pressure drop and resistance to smoke penetration, i.e., $$\text{Filtration Index} = \frac{100}{R} (2 - \text{Log } P)$$

where
R=average resistance, millimeters of water
P=average particle smoke penetration, %.

TABLE I

| Filter Paper of Example No. | 1 | 2 | 3 |
|---|---|---|---|
| Thickness (inch) | .012 | .011 | .010 |
| Tensile Strength (lbs/in) | 1.85 | 2.13 | 2.05 |
| Porosity (ft$^3$/min/ft$^2$) | 111 | 42.4 | 30.7 |
| Dynamic Sorption (mg/cm$^2$-$CCl_4$) | 0.21 | 0.11 | 0.06 |
| Static Sorption (% wt. pickup) | 25.8 | 22.6 | 16.0 |
| Pressure Drop (mm H$_2$O) | 6.00 | 23.0 | 33.0 |
| Particle Smoke Penetration (%) | 56.0 | 1.00 | 0.10 |
| Filtration Index | 4.20 | 8.70 | 9.10 |

TABLE II

| Filter Paper of Example No. | 4 | 5 | 6 |
|---|---|---|---|
| Tensile Strength (lbs/in) | 2.15 | 2.40 | 2.43 |
| Porosity (ft$^3$/min/ft$^2$) | 111 | 43.9 | 29.1 |
| Static Sorption (% wt. pickup) | 14.3 | 12.8 | 10.6 |
| Pressure Drop (mm H$_2$O) | 10.0 | 25.0 | 36.0 |
| Particle Smoke Penetration (%) | 42.0 | 0.90 | 0.08 |
| Filtration Index | 3.80 | 8.20 | 8.60 |

EXAMPLE 7

The procedure of Example 1 is again followed except that 15% of the activated carbon fibers is replaced by activated carbon particles in powder form. Similar results are achieved.

We claim:

1. A high efficiency, toxic vapor absorptive, nonwoven filter material comprising a wet-laid sheet containing fibrillated binder fiber, active carbon and submicron size glass fiber.

2. The filter material of claim 1 wherein the concentration of fibrillated binder fiber ranges from about 2–20%, by weight, based on the total weight of the material, the concentration of active carbon ranges from about 30–80%, by weight, same basis, and the concentration of the submicron size glass fiber ranges from about 10–50%, same basis.

3. The filter material of claim 1 wherein the active carbon is in the form of a fiber.

4. The filter material of claim 1 wherein the active carbon is in the form of particles.

5. The filter material of claim 1 wherein the binder is acrylic fiber.

6. The filter material of claim 1 wherein the surface thereof is treated with a hydrophobic and/or an oleophobic agent.

7. The filter material of claim 6 wherein the agent is 1,1-dihydropentadecafluorooctyl methacrylate.

8. The filter material of claim 1 wherein the active carbon is a blend of fiber and particles.

* * * * *

REEXAMINATION CERTIFICATE (1195th)

United States Patent [19]

Giglia

[11] B1 4,495,030

[45] Certificate Issued Jan. 23, 1990

[54] FILTER PAPER

[75] Inventor: Robert D. Giglia, Rye, N.Y.

[73] Assignee: American Cyanamid Company, Stamford, Conn.

Reexamination Request:
No. 90/001,419, Jan. 11, 1988

Reexamination Certificate for:
Patent No.: 4,495,030
Issued: Jan. 22, 1985
Appl. No.: 561,752
Filed: Dec. 15, 1983

[51] Int. Cl.⁴ .............. A62B 23/00; A62B 23/04; B01D 39/14; B01D 39/16; B01D 39/20
[52] U.S. Cl. ................................. 162/145; 2/2; 55/527; 55/528; 162/146; 162/149; 162/181.9; 428/283; 428/289; 428/290; 428/421; 428/903
[58] Field of Search .............. 2/2; 55/527, 528; 162/145, 146, 149, 181.9; 428/283, 289, 290, 421, 903

[56] References Cited

U.S. PATENT DOCUMENTS 3,826,712  7/1974  Masuda et al. ............ 162/157 R

FOREIGN PATENT DOCUMENTS 2216377  8/1974  France.

OTHER PUBLICATIONS

C.A. 95:22147d.
Abstr. Bull. Inst. of Paper Chem., 51(2) 2159.
Abstr. Bull. Inst. of Paper Chem. 54(6) 6784.

Primary Examiner—James C. Cannon

[57] ABSTRACT

A high efficiency, toxic vapor absorptive non-woven filter material comprising a wet-laid sheet containing fibrillated binder fiber, active carbon and submicron size glass fiber.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-7 and 8 is confirmed.

* * * * *